United States Patent
Hada

(10) Patent No.: US 7,296,738 B2
(45) Date of Patent: Nov. 20, 2007

(54) POS TERMINAL, METHOD OF CORRECTING A QUANTITY, AND COMPUTER-READABLE STORAGE MEDIUM RECORDING THEREIN A PROGRAM FOR CAUSING A COMPUTER TO CORRECT A QUANTITY

(75) Inventor: Tomohiro Hada, Maebashi (JP)

(73) Assignee: Fujitsu Limited, Kawasaki (JP)

( * ) Notice: Subject to any disclaimer, the term of this patent is extended or adjusted under 35 U.S.C. 154(b) by 449 days.

(21) Appl. No.: 10/893,313

(22) Filed: Jul. 19, 2004

(65) Prior Publication Data
US 2005/0203803 A1    Sep. 15, 2005

(30) Foreign Application Priority Data
Mar. 12, 2004  (JP) .............................. 2004-070004

(51) Int. Cl.
*G06K 15/00*  (2006.01)
(52) U.S. Cl. ...................... 235/383; 235/379; 235/380
(58) Field of Classification Search ................ 235/379, 235/380, 383, 375; 705/16, 24
See application file for complete search history.

(56) References Cited

U.S. PATENT DOCUMENTS 6,101,485 A *  8/2000  Fortenberry et al. .......... 705/27

2003/0083944 A1*  5/2003  Duvall et al. ................. 705/21

FOREIGN PATENT DOCUMENTS

| JP | SHO 57-97165 | 6/1982 |
| JP | HEI 3-276390 | 12/1991 |
| JP | HEI 8-83382 | 3/1996 |

* cited by examiner

*Primary Examiner*—Daniel Hess
(74) *Attorney, Agent, or Firm*—Staas & Halsey LLP

(57) ABSTRACT

A point-of-sale (POS) terminal includes a commodity information input part for inputting commodity information on commodities; a quantity input part for inputting a quantity for the commodities; and a storage part for storing the quantity and the commodity information, as item information. The POS terminal further includes a calculation part for calculating an amount of money involved in the transaction in dependence on the item information stored in the storage part; a quantity correction indication part for indicating correction of the quantity; and a quantity correction part for correcting the quantity. When the correction is indicated, the quantity correction part corrects the quantity by replacing the quantity in the item information last stored in the storage part with another quantity newly input by the quantity input part. The calculation part recalculates the amount of money based on the new quantity.

6 Claims, 13 Drawing Sheets

FIG. 3

| MENU | OP | SALES | | CHECKER | | 2004/02/23 | 15:17 |
| | | | | CASHER | MICHIKO FUJI | POS 0010 | V05L10 |

| No. | ITEM NAME | TAX | UNIT PRICE | QUANTITY | DISCOUNT TOTAL | TOTAL PRICE | SET |
|---|---|---|---|---|---|---|---|
| 1 | COMMODITY A | | 500 | 1 | | 500 | |

◁    ▷

SUB-TOTAL ¥500
DISCOUNT SUB-TOTAL ¥0
TAX AMOUNT ¥25
SUM QUANTITY 1

TOTAL AMOUNT ¥525

DEPOSIT

TRANSACTION SERIAL NO. 5859
CARD
CUSTOMER GROUP
ORIGINAL REGISTER NO. / ORIGINAL SERIAL NO.

PLEASE REGISTER COMMODITIES

| JOURNAL INQUIRY | STOP | CUSTOMER | | | DISCOUNT | % DISCOUNT | COST CONFIRMATION | | QUANTITY CORRECTION | CORRECTION/DELETION | PAGE SWITCHING |

171: QUANTITY CORRECTION KEY

| MENU | OP | SALES | | | CHECKER | | 2004/02/23 | 15:17 |
|------|----|----|---|---|---------|--|------------|-------|
| | | | | | CASHER | MICHIKO FUJI | POS 0010 | V05L10 |

| No. | ITEM NAME | TAX | UNIT PRICE | QUANTITY | DISCOUNT TOTAL | TOTAL PRICE | SET |
|---|---|---|---|---|---|---|---|
| 1 | COMMODITY A | | 500 | 1 | | 500 | |

◁  ▷

| SUB-TOTAL | ¥500 | TOTAL AMOUNT | ¥525 |
|---|---|---|---|
| DISCOUNT SUB-TOTAL | ¥0 | DEPOSIT | |
| TAX AMOUNT | ¥25 | | |
| SUM QUANTITY | 1 | | |

TRANSACTION SERIAL NO. 5859
CARD
CUSTOMER GROUP
ORIGINAL SERIAL NO.
ORIGINAL REGISTER NO.

*PLEASE CORRECT THE QUANTITY*

*QUANTITY INPUT GUIDANCE*

JOURNAL INQUIRY | STOP

| MENU | OP | SALES | | | CHECKER | | 2004/02/23 | 15:17 |
| | | | | | CASHER | MICHIKO FUJI | POS 0010 | V05L10 |

| No. | ITEM NAME | TAX | UNIT PRICE | QUANTITY | DISCOUNT TOTAL | TOTAL PRICE | SET |
|---|---|---|---|---|---|---|---|
| 1 | COMMODITY A | | 500 | 5 | | 2,500 | |
| | | | | | | | |
| | | | | | | | |
| | | | | | | | |
| | | | | | | | |
| | | | | | | | |

◁  ▷

SUB-TOTAL ¥2,500
DISCOUNT SUB-TOTAL ¥0        TOTAL AMOUNT     ¥2,625
TAX AMOUNT ¥125              DEPOSIT
SUM QUANTITY 5

TRANSACTION SERIAL NO. 5859
CARD
CUSTOMER GROUP
ORIGINAL SERIAL NO.
ORIGINAL REGISTER NO.

PLEASE REGISTER COMMODITIES

| JOURNAL INQUIRY | STOP | CUSTOMER | | DISCOUNT | % DISCOUNT | COST CONFIRMATION | QUANTITY CORRECTION | CORRECTION/ DELETION | PAGE SWITCHING |

171: QUANTITY CORRECTION KEY

| No. | ITEM NAME | TAX | UNIT PRICE | QUANTITY | DISCOUNT TOTAL | TOTAL PRICE | SET |
|---|---|---|---|---|---|---|---|
| 1 | COMMODITY A | | 500 | 5 | | 2,500 | |
| 2 | COMMODITY B | | 205 | 1 | | 205 | |
| | | | | | | | |
| | | | | | | | |
| | | | | | | | |
| | | | | | | | |

MENU  OP  SALES

CHECKER
CASHIER  MICHIKO FUJI

2004/02/23   15:17
POS 0010   V05L10

SUB-TOTAL  ¥2,705
DISCOUNT SUB-TOTAL  ¥0
TAX AMOUNT  ¥135
SUM QUANTITY  6

TOTAL AMOUNT  ¥2,840
DEPOSIT

TRANSACTION SERIAL NO.  5856
CARD
CUSTOMER GROUP
ORIGINAL SERIAL NO.
ORIGINAL REGISTER NO.

PLEASE REGISTER COMMODITIES

JOURNAL INQUIRY | STOP | CUSTOMER | | DISCOUNT | % DISCOUNT | COST CONFIRMATION | QUANTITY CORRECTION | CORRECTION/DELETION | PAGE SWITCHING

171: QUANTITY CORRECTION KEY

| MENU | OP | SALES | | CHECKER | | 2004/02/23 | 15:17 |
|---|---|---|---|---|---|---|---|
| | | | | CASHER | MICHIKO FUJI | POS 0010 | V05L10 |

| No. | ITEM NAME | TAX | UNIT PRICE | QUANTITY | DISCOUNT TOTAL | TOTAL PRICE | SET |
|---|---|---|---|---|---|---|---|
| 1 | COMMODITY A | | 500 | 5 | | 2,500 | |
| 2 | COMMODITY B | | 205 | 1 | | 205 | |

| SUB-TOTAL | ¥2,705 | | TOTAL AMOUNT | ¥2,840 |
|---|---|---|---|---|
| DISCOUNT SUB-TOTAL | ¥0 | | DEPOSIT | |
| TAX AMOUNT | ¥135 | | | |
| SUM QUANTITY | 6 | | | |

TRANSACTION SERIAL NO. 5856
CARD
CUSTOMER GROUP
ORIGINAL SERIAL NO.
ORIGINAL REGISTER NO.

*PLEASE CORRECT THE QUANTITY*

*QUANTITY INPUT GUIDANCE*

| JOURNAL INQUIRY | STOP | | | | | | | | | |

FIG. 10

| No. | ITEM NAME | TAX | UNIT PRICE | QUANTITY | DISCOUNT TOTAL | TOTAL PRICE | SET |
|---|---|---|---|---|---|---|---|
| 1 | COMMODITY A | | 500 | 10 | | 5,000 | |
| 2 | COMMODITY B | | 205 | 1 | | 205 | |
| | | | | | | | |
| | | | | | | | |
| | | | | | | | |
| | | | | | | | |

CHECKER: 
CASHIER: MICHIKO FUJI
2004/02/23  POS 0010  15:17  V05L10

SUB-TOTAL: ¥5,205
DISCOUNT SUB-TOTAL: ¥0
TAX AMOUNT SUM: ¥260
QUANTITY: 11

TOTAL AMOUNT: ¥5,465
DEPOSIT:

TRANSACTION SERIAL NO.: 5856
CARD:
CUSTOMER GROUP:
ORIGINAL REGISTER NO.:
ORIGINAL SERIAL NO.:

PLEASE REGISTER COMMODITIES

JOURNAL INQUIRY | STOP | CUSTOMER | | | DISCOUNT | % DISCOUNT | COST CONFIRMATION | | QUANTITY CORRECTION | CORRECTION/DELETION | PAGE SWITCHING

171: QUANTITY CORRECTION KEY

| COMMODITY A | 5 COMMODITIES | ¥ 2 , 5 0 0 |
|---|---|---|
| PLEASE REGISTER COMMODITIES | | |

FIG. 11B

| COMMODITY A | 5 COMMODITIES | ¥ 2 , 5 0 0 |
|---|---|---|
| PLEASE CORRECT THE QUANTITY | | |

FIG. 11C

| COMMODITY A | 10 COMMODITIES | ¥ 5 , 0 0 0 |
|---|---|---|
| PLEASE REGISTER COMMODITIES | | |

FIG. 12A

| COMMODITY B | ¥ 2 0 5 |
|---|---|
| SUB-TOTAL (WITH TAX INCLUDED) | ¥ 2 , 8 4 0 |

FIG. 12B

| COMMODITY A  10 COMMODITIES | ¥ 5 , 0 0 0 |
|---|---|
| SUB-TOTAL (WITH TAX INCLUDED) | ¥ 5 , 4 6 5 |

POS TERMINAL, METHOD OF CORRECTING A QUANTITY, AND COMPUTER-READABLE STORAGE MEDIUM RECORDING THEREIN A PROGRAM FOR CAUSING A COMPUTER TO CORRECT A QUANTITY

BACKGROUND OF THE INVENTION (1) Field of the Invention

The present invention relates to a point-of-sale terminal (POS terminal) for inputting a quantity for commodities involved in a transaction and inputting commodity information on the commodities, a method of correcting the quantity, and a computer-readable storage medium with a program for causing a computer to correct the quantity.

(2) Description of the Related Art

In the POS terminal of a POS system for registration of transaction information on commodities, when selling a plurality of identical commodities in a transaction, the quantity of commodities is typically registered by two registration methods, a pre-declaration method and an after-declaration method.

In the pre-declaration method, commodity registration is performed after the declaration of a quantity. More specifically, the quantity of commodities is first declared by inputting the quantity with a numeric key, etc., provided in the POS terminal. Then, commodity registration is performed by inputting information on the commodities (an identification number, etc.) with a bar-code reader, etc. For example, when registering (or selling) two identical commodities, a numeric key "2" is depressed and then a Multiplication (×) key is depressed. This means that the depressed numeric key is a multiplier. Next, the commodity is scanned with a bar-code reader.

In the after-declaration method, the declaration of a quantity is performed after commodity registration. For instance, when registering two identical commodities, scanning is performed with a bar-code reader, and then the numeric key "2" and Multiplication (×) key are depressed.

In the above-described POS system, there is a possibility that an operator will register an incorrect quantity. Because of this, in conventional POS systems, an incorrect quantity registered can be corrected by methods disclosed in Japanese Patent Laid-Open Nos. HEI 3-276390, HEI 8-83382, and SHO 57-97165.

For instance, in the after-declaration method, when an operator inputs an incorrect quantity, the quantity can be corrected by inputting only a correct quantity with a numeric key and a Multiplication (×) key immediately after the incorrect input. Until the time the next commodity is scanned with a bar-code reader, an incorrect quantity can be easily corrected by inputting a correct quantity with a numeric key and a Multiplication (×) key immediately after the input of the incorrect quantity.

However, in the pre-declaration method, the input of a quantity through a numeric key, which is performed after scanning is performed by a bar-code reader, is handled as the declaration of a quantity for the next item. Therefore, after an item registered by an incorrect quantity is deleted, it is necessary to perform quantity declaration and commodity registration again.

That is, when correcting an incorrect quantity registered by the pre-declaration method, the operator has to perform four steps, (1) selection of an item to be corrected, (2) deletion of the item, (3) quantity declaration (e.g., depression of a numeric key "2" and a Multiplication (×) key), and (4) commodity registration (re-registration). These four steps is a troublesome and time-consuming operation. In addition, there is a possibility that when performing commodity registration, other commodities will be registered by mistake.

In the pre-declaration method and after-declaration method, when correcting a quantity for an item registered two or more before, that item is deleted and then it is necessary to perform quantity declaration and commodity registration again. As described above, it is necessary to perform four steps, (1) selection of an item to be corrected, (2) deletion of the item, (3) quantity declaration (e.g., depression of a numeric key "2" and a Multiplication (×) key), and (4) commodity registration.

SUMMARY OF THE INVENTION

The present invention has been made in view of the circumstances described above. Accordingly, it is the primary object of the present invention to provide a POS terminal, a quantity correction method, and a computer-readable medium with a quantity correction program, which are capable of correcting a quantity easily and preventing commodity misregistration from taking place during the correction.

To achieve this end, there is provided a first point-of-sale terminal including a commodity information input part for inputting commodity information on commodities involved in a transaction; a quantity input part for inputting a quantity for the commodities; a storage part for storing the quantity and the commodity information, as item information; a calculation part for calculating an amount of money involved in the transaction in dependence on the item information stored in the storage part; the point-of-sale terminal comprising a quantity correction indication part for indicating correction of the quantity; and a quantity correction part for correcting the quantity, when the correction is indicated by the correction indication part, by replacing the quantity in the item information last stored in the storage part with another quantity newly input by the quantity input part; the calculation part recalculating the amount of money based on the new quantity.

In accordance with the present invention, there is provided a second point-of-sale terminal including a commodity information input part for inputting commodity information on commodities involved in a transaction; a quantity input part for inputting a quantity for the commodities; a storage part for storing the quantity and the commodity information, as item information; and a calculation part for calculating an amount of money involved in the transaction in dependence on the item information stored in the storage part; the point-of-sale terminal comprising a quantity correction indication part for indicating correction of the quantity; an item selection part for selecting item information containing the quantity to be corrected, from the item information stored in the storage part; and a quantity correction part for correcting the quantity, when the correction is indicated by the correction indication part, by replacing the quantity in the item information selected by the item selection part with another quantity newly input by the quantity input part; the calculation part recalculating the amount of money based on the new quantity.

In accordance with the present invention, there is provided a first quantity correction method for use in a point-of-sale terminal which includes a commodity information input part for inputting commodity information on commodities involved in a transaction; a quantity input part for inputting a quantity for the commodities; a storage part for storing the quantity and the commodity information, as item information; a calculation part for calculating an amount of money involved in the transaction in dependence on the item information stored in the storage part; the method comprising a quantity correction indication step of indicating correction of the quantity; and a quantity correction step of correcting the quantity, when the correction is indicated in the indication step, by replacing the quantity in the item information last stored in the storage part with another quantity newly input by the quantity input part; a recalculating step of recalculating the amount of money recalculated in the calculation part based on the new quantity.

In accordance with the present invention, there is provided a second quantity correction method for use in a point-of-sale terminal which includes a commodity information input part for inputting commodity information on commodities involved in a transaction; a quantity input part for inputting a quantity for the commodities; a storage part for storing the quantity and the commodity information, as item information; a calculation part for calculating an amount of money involved in the transaction in dependence on the item information stored in the storage part; the method comprising a quantity correction indication step of indicating correction of the quantity; an item selection step of selecting item information containing the quantity to be corrected, from the item information stored in the storage step; and a quantity correction step of correcting the quantity, when the correction is indicated in the indication step, by replacing the quantity in the item information selected in the item selection step with another quantity newly input by the quantity input part; a recalculating step of recalculating the amount of money recalculated in the calculation part based on the new quantity.

In accordance with the present invention, there is provided a first computer-readable storage medium recording therein a quantity correction program for causing a computer to function for use in a point-of-sale terminal which includes: a commodity information input part for inputting commodity information on commodities involved in a transaction; a quantity input part for inputting a quantity for the commodities; a storage part for storing the quantity and the commodity information, as item information; a calculation part for calculating an amount of money involved in the transaction in dependence on the item information stored in the storage part; the program instruct the computer to function as the following: a quantity correction indication part for indicating correction of the quantity; and a quantity correction part for correcting the quantity, when the correction is indicated by the correction indication part, by replacing the quantity in the item information last stored in the storage part with another quantity newly input by the quantity input part; the calculation part recalculating the amount of money based on the new quantity.

In accordance with the present invention, there is provided a second computer-readable storage medium recording therein a quantity correction program for causing a computer to function for use in a point-of-sale terminal which includes: a commodity information input part for inputting commodity information on commodities involved in a transaction; a quantity input part for inputting a quantity for the commodities; a storage part for storing the quantity and the commodity information, as item information; a calculation part for calculating an amount of money involved in the transaction in dependence on the item information stored in the storage part; the program instruct the computer to function as the following: a quantity correction indication part for indicating correction of the quantity; an item selection part for selecting item information containing the quantity to be corrected, from the item information stored in the storage part; and a quantity correction part for correcting the quantity, when the correction is indicated by the correction indication part, by replacing the quantity in the item information selected by the item selection part with another quantity newly input by the quantity input part; function as the calculation part recalculating the amount of money based on the new quantity.

According to the present invention, a quantity for an item can be easily corrected and commodity misregistration can be prevented during the correction.

BRIEF DESCRIPTION OF THE DRAWINGS

The present invention will be described in further detail with reference to the accompanying drawings wherein:

FIG. 3 is a schematic diagram showing an example displayed on the screen of the touch panel of the POS terminal shown in FIG. 1;

FIG. 5 is a schematic diagram showing a second example displayed on the screen of the touch panel of the POS terminal shown in FIG. 1;

FIG. 6 is a schematic diagram showing a third example displayed on the screen of the touch panel of the POS terminal shown in FIG. 1;

FIG. 8 is a schematic diagram showing a fourth example displayed on the screen of the touch panel of the POS terminal shown in FIG. 1;

FIG. 9 is a schematic diagram showing a fifth example displayed on the screen of the touch panel of the POS terminal shown in FIG. 1;

FIG. 10 is a schematic diagram showing a sixth example displayed on the screen of the touch panel of the POS terminal shown in FIG. 1;

FIGS. 11A, 11B, and 11C are diagrams showing examples displayed on the screen of the display of the multi-item keyboard of the POS terminal shown in FIG. 1;

FIGS. 12A and 12B are diagrams showing examples displayed on the screen of the customer display panel of the POS terminal shown in FIG. 1.

DESCRIPTION OF THE PREFERRED EMBODIMENTS

Figure 1:
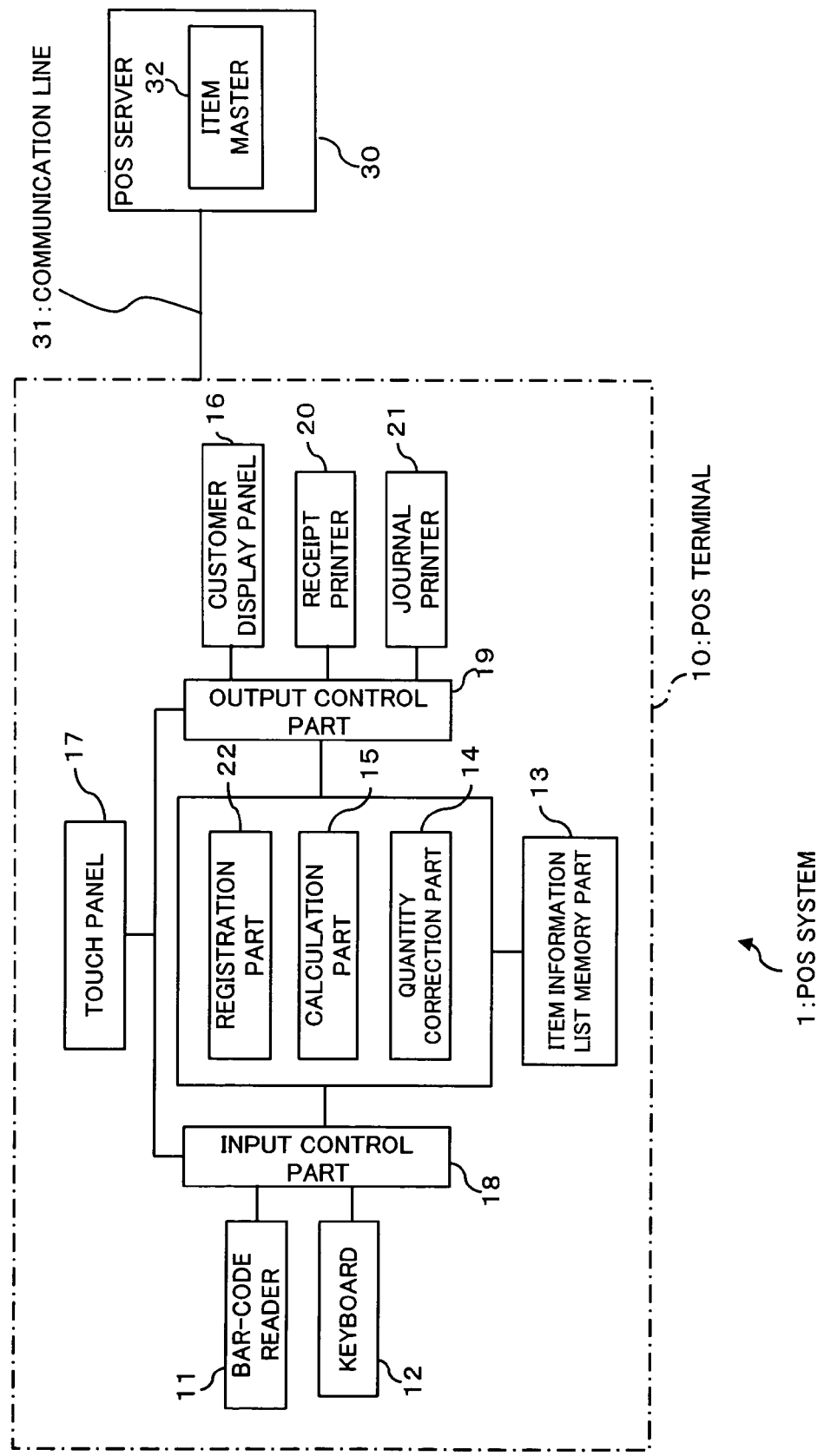
FIG. 1 is a block diagram showing a POS system with a POS terminal constructed in accordance with a preferred embodiment of the present invention.
Figure 2:
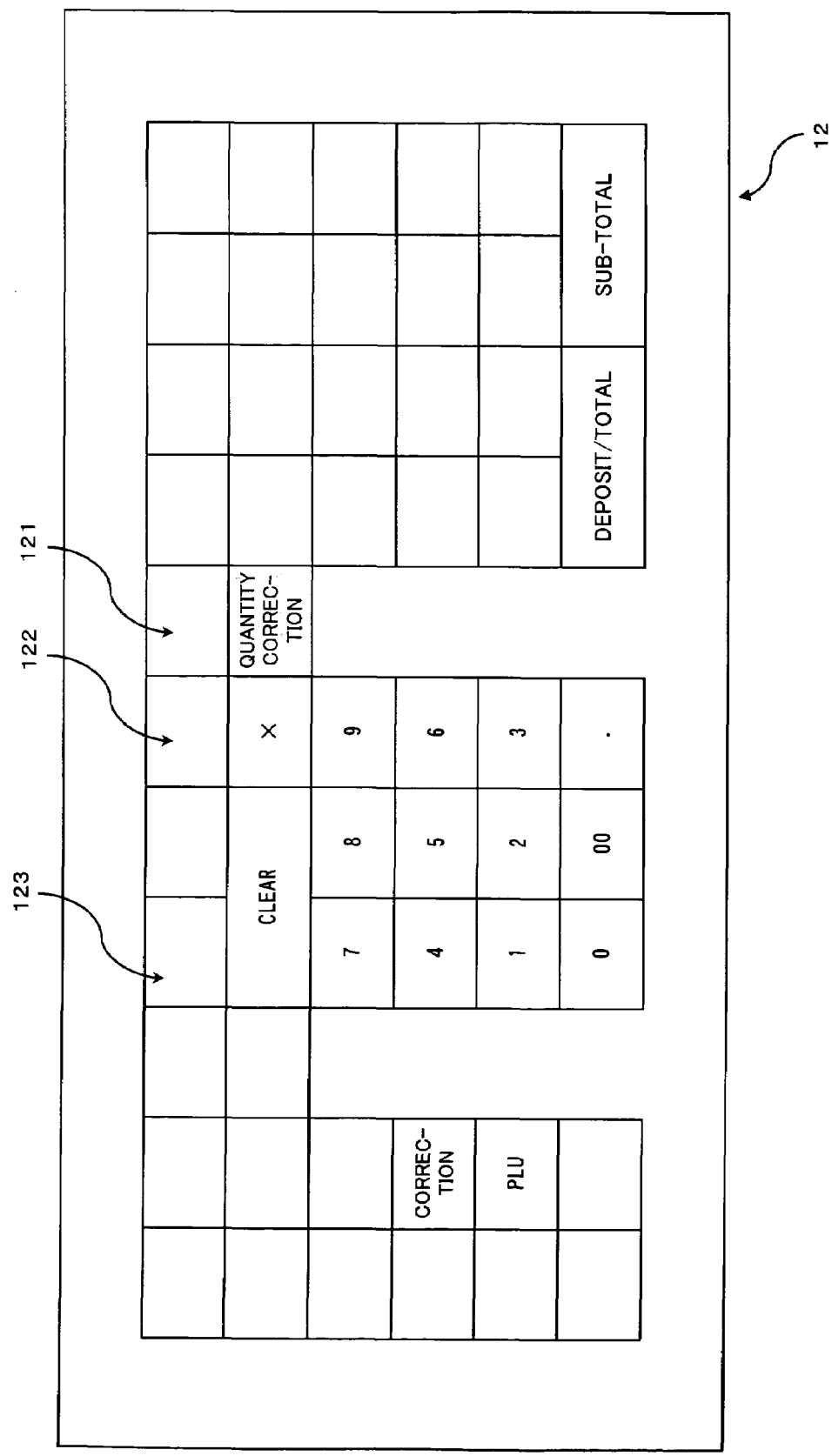
FIG. 2 is a schematic diagram showing the keyboard of the POS terminal shown in FIG. 1.

Referring now in greater detail to the drawings and initially to FIGS. 1 through 3, there is shown a POS system 1 with a POS terminal constructed in accordance with a preferred embodiment of the present invention.

The POS system 1 is used in a store for collecting, calculating, and analyzing various kinds of information (the quantity of commodities sold, etc.) at the point where commodities are sold. As shown in FIG. 1, the POS system 1 is made up of a POS terminal 10 and a POS server 30. In an example shown in FIG. 1, the POS system 1 includes one POS terminal 10 and one POS sever 30, but the present invention is not limited to this example. For instance, the POS system 1 may include two or more POS terminal 10, or may include a plurality of POS servers 30 according to purposes.

The POS server 30 is connected so it can communicate with the POS terminal 10 through a communication line 31. This POS server 30 acquires, calculates, and analyzes various kinds of information transmitted from the POS terminal 10. The POS server 30 also manages an item master 32 that registers information, such as a unit price, an item name, etc., for commodities handled in stores, and further transmits that information to the POS terminal 10 through the communication line 31.

The POS terminal 10 is installed in a store, for customer checkout and acquiring and registering various kinds of information on the transaction. As shown in FIG. 1, the POS terminal 10 is equipped with a bar-code reader (a commodity information input part and a quantity input part) 11, a keyboard (a quantity input part, a quantity correction indication part, and an item selection part) 12, an item information list memory part (storage part) 13, a quantity correction part 14, a calculation part 15, and a customer display panel 16, a touch panel (an item selection part and a quantity correction indication part) 17, an input control part 18, an output control part 19, a receipt printer 20, a journal printer 21, and a registration part 22.

The bar-code reader 11 inputs or registers commodity information on commodities involved in a transaction. More specifically, the bar-code reader 11 acquires commodity information by scanning a bar code printed on a commodity and sends the acquired commodity information to the registration part 22 (described later). Note that the means to input commodity information is not limited to the bar-code reader 11. The input means may be modified within the scope of the present invention. For example, an operator may input a commodity code with the keyboard 12 (described in detail later).

The keyboard 12 inputs a quantity for commodities involved in a transaction. As shown in FIG. 2, the keyboard 12 is equipped with numeric keys, a Correction key, a Clear key 123, a Deposit/Total key, a Quantity Correction key (which corresponds to a quantity correction indication part) 121, a Multiplication (×) key 122, etc. An operator causes the POS terminal 10 to perform various kinds of processing by selectively depressing these keys when necessary.

In the POS terminal 10, the input of the quantity of sold commodities (a quantity for an item) by the keyboard 12 is performed by selecting a numeric key "n" (where n is a natural number) indicative of a quantity and then depressing the Multiplication (×) key 122 indicating that a plurality of commodities were sold.

The Quantity Correction key 121 of the keyboard 12 is employed when an operator corrects a quantity (total-number). If the operator depresses the Quantity Correction key, the quantity correction part 14 corrects a quantity, as described in detail later. Note that the Quantity Correction key of the keyboard 12 will hereinafter be represented as the Quantity Correction key 121 (which corresponds to a quantity correction indication part).

In the POS terminal 10, when registering or selling commodities, the input of the quantity by the keyboard 12 is performed only when a plurality of identical commodities are registered at a time. In the case where a quantity is 1, it is not necessary to depress the numeric key "1" and Multiplication (×) key of the keyboard 2. When one commodity is registered through the bar-code reader 11 without using the keyboard 12, a quantity "1" is automatically set as the initial value. In addition, information on a quantity input through the keyboard 12 is delivered to the registration part 22.

In the POS system 10, when selling a plurality of identical commodities, they may be registered by either the pre-declaration method (which performs commodity registration after the declaration of a quantity) or the after-declaration method (which performs the declaration of a quantity after commodity registration). By previously selecting one of the two methods, the input manipulation can be performed with the selected method.

In the preferred embodiment, a description will hereinafter be given in the case where a quantity and commodities are registered by the pre-declaration method. That is, in the POS system 10, by inputting a quantity through the keyboard 12 and then performing commodity registration with the bar-code reader 11, information on an item (item information) is registered.

More specifically, when registering a plurality of identical commodities in one transaction, a numeric key "n" indicative of a quantity is first selected in the keyboard 12. Then, the Multiplication (×) key 122 is depressed. Thereafter, commodity registration is performed by the bar-code reader 11.

Note that the keyboard 12 may be replaced with a multi-item keyboard with a display for presenting an item name, a quantity, a total price, and a message to an operator (see FIGS. 11A to 11C).

In dependence on the commodity information scanned by the bar-code reader 11, the registration part 22 acquires item information on that commodity and registers it as item list information in the item information list memory part 13. More specifically, the registration part 22 acquires item information (an item name, a unit price, etc.) by referring to the item master 32 of the POS server 30 in dependence on the commodity code (commodity information) scanned by the bar-code reader 11. In addition, when a quantity is input through the keyboard 12 before a commodity code is scanned by the bar-code reader 11, the registration part 22 registers the input number in the item information list memory part 13. On the other hand, when no quantity is input through the keyboard 12, the registration part 22 registers 1 in the item information list memory part 13. At this time, the input number or 1 is registered as item list information so that it is correlated with the above-described item name and unit price.

The registration part 22 further sets different item numbers to item information registered in one transaction. With these different item numbers, specific item information can be selected in one transaction. That is, for example, if an item number is input through the keyboard 12, the item information specified by the item number can be selected from the item information stored in the item information list memory part 13. Thus, the keyboard 12 also functions as an item selection part.

The item information list memory part 13 stores commodity information and a quantity, input through the bar-code reader 11 and keyboard 12, as item information. This item information list memory part 13 is constructed of a memory device such as a random access memory, etc.

The item information list memory part 13 generates and stores an item information list, in which a quantity is correlated with commodity information (a commodity code, an item name, a unit price, etc.) for all commodities registered in one transaction. In the item information list memory part 13, many pieces of item information on all commodities registered in at least one transaction are stored in a time-series as an item information list. Note that there are cases where item information registered in that item information list will hereinafter be referred to as item list information.

And the registration of item information into the item information list memory part 13 is controlled by the registration part 22.

The touch panel 17, in addition to commodity information and a quantity input through the bar-code reader 11 and keyboard 12, presents the content of the item information list registered in the item information list memory part 13 to an operator, and allows the operator to send signals to the POS terminal 10 by touching an area on the screen with a finger, pencil, or other object.

For instance, in an example shown in FIG. 3, commodity "A" of unit price 500 yen is registered as item list information, and "Item Name," "Unit Price," "Quantity," "Discount Total," "Total Price," "Total Amount," etc., are displayed as a list on the touch panel 17. Thus, in the touch panel 17, item information stored in the item information list memory part 13 is displayed as an item information list. And the operator is able to confirm commodity registration by viewing the information displayed on the touch panel 17.

By touching item information where a quantity is to be corrected, the operator is also able to select the specific item information from the item information list displayed on the touch panel 17. Thus, the touch panel 17 also functions as an item information selection part that allows an operator to select item information where a quantity is to be corrected, from the item information list displayed on the screen. Note that the item information selected in this way is delivered to the quantity correction part 14.

Also, in the touch panel 17, keys for executing various functions are displayed on the screen. In the example shown in FIG. 3, there are disposed keys for executing "Journal Inquiry," "Stop," "Customer," "Discount," "% Discount," "Price Confirmation," "Quantity Correction," "Correction/Deletion," and "Page Switching" on the bottom of the screen. And by touching these keys displayed on the screen when necessary, the operator is able to execute each function.

Note that the "Quantity Correction" key displayed on the touch panel 17 will hereinafter be represented as a Quantity Correction key 171.

In the POS terminal 10, if the operator selects the Quantity Correction key 171, the quantity correction part 14 corrects a quantity, as described in detail later. Note that in the POS terminal 10, when commodity information is registered by the bar-code reader 11, the item information on the commodity, last registered, has been selected. Therefore, if the Quantity Correction key 121 or Quantity Correction key 171 is selected in this state, the quantity correction part 14 corrects a quantity for the item information on the commodity last registered. Also, when the Quantity Correction key 121 or Quantity Correction key 171 is selected in the state where a specific item is selected on the touch panel 17, the quantity correction part 14 corrects a quantity for the item information selected on the touch panel 17.

If the Correction/Deletion key is selected in the state where specific item information is selected on the touch panel 17, the selected item information can be deleted. This makes it possible to register item information from the beginning in the same manner as the quantity correction method used in conventional POS terminals.

The quantity correction part 14 is used for correcting a quantity on the item information list stored in the item information list memory part 13. Therefore, when the correction of a quantity is selected by the Quantity Correction key 121 or Quantity Correction key 171, a quantity on the item information list selected through the touch panel 17 is replaced with another quantity newly input through the keyboard 12. In this way, the selected quantity through the touch panel 17 is corrected. That new quantity is correlated with the commodity information of the selected item information and is stored in the item information list memory part 13.

In dependence on item information stored in the item information list memory part 13, the calculation part 15 calculates an account of money involved in the transaction. For instance, the calculation part 15 calculates a total price for each commodity by multiplying a unit price by a quantity, or calculates a total amount by summing up the total prices. In the POS terminal 10, when a quantity is corrected by the quantity correction part 14, the calculation part 15 recalculates the total price and total amount in dependence on the corrected quantity. Note that the calculation (or recalculation) of the total price and total account by the calculation part 15 is performed, for example, when the Multiplication (×) key 122 is depressed after the input of a numeric key indicative of a quantity.

In the POS terminal 10, the functions of the above-described registration part 22, quantity correction part 14, and calculation part 15 are realized by executing a program (a business application program, a quantity correction program, etc.) with a central processing unit (CPU) installed in the POS terminal 10.

Note that the program (a quantity correction program, etc.) for realizing the functions of the registration part 22, quantity correction part 14, and calculation part 15 is provided in a form recorded on a computer-readable medium such as flexible disks, CD-ROM, CD-R, CD-R/W, DVD, DVD-R, DVD-R/W, magnetic disks, optical disks, magneto-optic disks, etc. And the computer reads out the program from the computer-readable medium and transfers it to an internal storage device or external storage device. Also, by previously storing the program in a storage device such as magnetic disks, optical disks, magneto-optic disks, etc., it may be sent from the storage device to the computer through a communication path.

When realizing the functions of the registration part 22, quantity correction part 14, and calculation part 15, the program stored in an internal storage device (e.g., the RAM or ROM installed in the POS terminal 10 of the preferred embodiment) is carried out by the microprocessor of the computer (e.g., the CPU of the printer of the preferred embodiment). At this time, the computer may carry out the program stored in the storage device by reading out the program from the device.

In the preferred embodiment, the aforementioned computer includes hardware and an operating system (OS) and refers to hardware that operates under control of the OS. Also, in the case where hardware can be operated by an application program alone without the OS, the hardware itself corresponds to the computer. The hardware has at least a microprocessor such as a CPU, and means for reading out computer programs from a storage medium. In the preferred embodiment, the POS terminal 10 has the function of the computer.

The above-described storage medium in the preferred embodiment, in addition to the aforementioned flexible disks, CD-ROM, CD-R, CD-R/W, DVD, DVD-R, DVD-R/

W, magnetic disks, optical disks, and magneto-optical disks, may also include IC cards, ROM cartridges, magnetic tape, punch cards, internal storage media for computers (memory such as RAM and ROM), external storage media, and computer-readable media such as a print with a bar code.

The customer display panel 16 displays to a customer the commodity information read through the bar-code reader 11 or transaction information such as a quantity input through the keyboard 12, and is constructed of a liquid crystal display, etc.

The receipt printer 20 prints various kinds of transaction information on receipt paper that is given to a customer. The journal printer 21 prints various kinds of transaction information on journal paper. The output control part 19 controls data that is output to the customer display panel 16, touch panel 17, receipt printer 20, and journal printer 21. The input control part 18 controls the data input from the bar-code reader 11, keyboard 12, and touch panel 17.

In the POS terminal 10 constructed as described above, a method of correcting a quantity for an item last input will be described according to a flowchart (steps A10 to A80) shown in FIG. 4, with reference to FIGS. 3, 5, and 6. FIGS. 5 and 6 show examples displayed on the screen of the touch panel 17 of the POS terminal 10, respectively. In an example shown in FIG. 4, a quantity "1" is registered for commodity "A" by mistake and is corrected to a correct quantity "5."

When registering the transaction of commodity A in the POS terminal 10, the operator inputs a numeric key "1" by mistake (step A10). Next, the Multiplication "×" key is depressed and input (step A20). Thereafter, commodity A is scanned by the bar-code reader 11 (step A30), and the registration part 22 registers the commodity information and quantity for commodity A in the item information list memory part 13 as the item information. As shown in FIG. 3, the item information is displayed on the touch panel 17.

In the state after the registration of the commodity information through the bar-code reader 11, the item information on commodity A last registered has been selected (step A40). In this state, if the operator selects the Quantity Correction key 121 or Quantity Correction key 171 (step A50), a quantity is corrected for the information on the item last registered. As shown in FIG. 5, a quantity input guidance, such as "Please correct the quantity", is displayed on the touch panel 17. In this way, the quantity for the item information on commodity A can be corrected.

If the operator inputs a correct quantity "5" with the numeric key "5" of the keyboard 12 in accordance with the quantity input guidance (step A60) and then depresses the "×" key (step A70), the quantity for commodity A is corrected by the quantity correction part 14. As shown in FIG. 6, item list information with the corrected quantity is displayed on the touch panel 17. That is, the calculation part 15 recalculates the total price and total amount, using the corrected quantity. The result of recalculation is displayed on the touch panel 17. Thereafter, the operator scans the next commodity "B" with the bar-code reader 11 (step A80).

For an item input two or more before, the quantity correction method will be described according to a flowchart (steps B10 to B90) shown in FIG. 7, with reference to FIGS. 8 to 12. In the following description, the keyboard 12 is assumed to be a multi-item keyboard with a display. Also, the information displayed on the screen of the multi-item keyboard will be described together.

Figure 7:
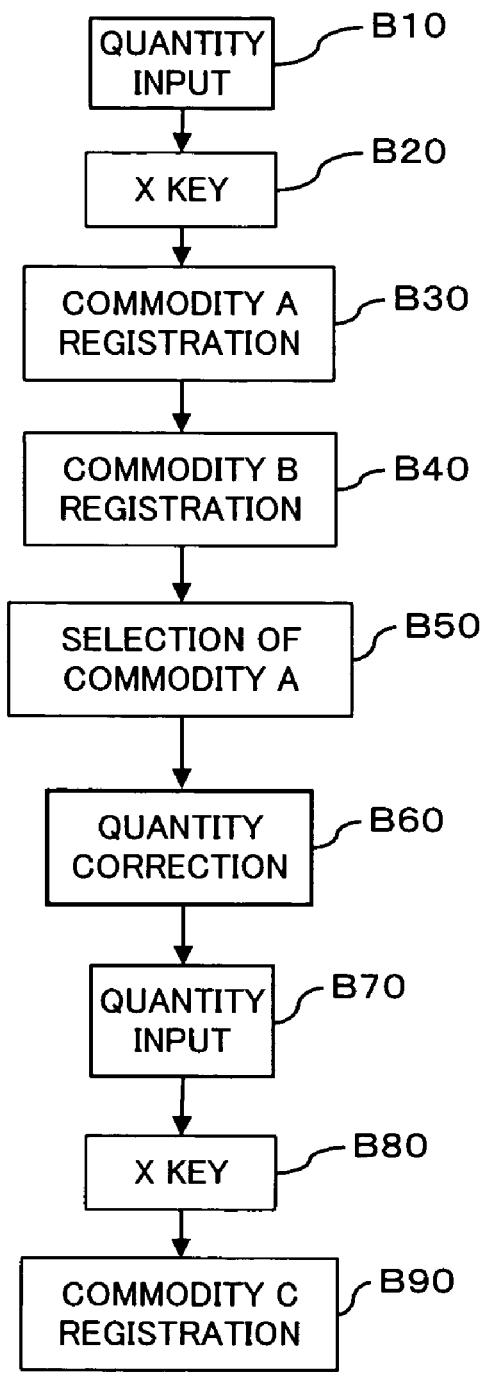
FIG. 7 is a flowchart showing how a quantity for an item input two or more before is to be corrected by the POS terminal shown in FIG. 1.

In an example shown in FIG. 7, a quantity "5" is registered for commodity A by mistake and is corrected to a correct quantity "10" after commodity B is registered.

That is, when registering the transaction of commodity A in the POS terminal 10, the operator depresses and inputs a numeric key "5" by mistake (step B10). Next, the "×" key is depressed and input (step B20). Thereafter, commodity A is scanned by the bar-code reader 11 (step B30), and the registration part 22 registers the commodity information and quantity for commodity A in the item information list memory part 13 as the item information.

Next, if the operator registers commodity information on commodity B with the bar-code reader 11 (step B40), the registration part 22 registers a quantity "1" in the item information list memory part 13 as the item information on commodity B.

If the operator selects the item information on commodity A from the list displayed on the touch panel 17 (step B50), item list information is displayed on the touch panel 17 with the item information on the commodity "A" being selected, as shown in FIG. 8. At this time, as shown in FIG. 11A, the item information on the selected commodity A (an item name and a quantity), the total price, and a guidance for the operator are displayed on the screen of the multi-item keyboard. Also, as shown in FIG. 12A, the item name and total price for commodity B registered last are displayed on the customer display panel 16.

In this state, if the operator selects the Quantity Correction key 121 or Quantity Correction key 171 (step B60), a quantity can be corrected for the item information being selected. Therefore, as shown in FIG. 9, a quantity input guidance, such as "Please correct the quantity", will be displayed on the touch panel 17. Also, as shown in FIG. 11B, a quantity input guidance, such as "Please correct the quantity", will be displayed on the screen of the multi-item keyboard. That is, for the item information on commodity A selected in step B50, the quantity can be corrected.

If the operator inputs a correct quantity "10" with the numeric keys "1" and "0" of the keyboard 12 in accordance with the quantity input guidance (step B70) and then depresses the "×" key (step B80), the quantity for commodity A is corrected by the quantity correction part 14. As shown in FIG. 10, item list information with the corrected quantity is displayed on the touch panel 17. That is, the calculation part 15 recalculates the total price and total amount, using the corrected quantity. The result of recalculation is displayed on the touch panel 17, screen of the multi-item keyboard, and each screen of the customer display panel. Thereafter, the operator is able to return to the operation of registering other commodities. When all commodities are registered, the transaction is completed through customer checkout.

Also, as shown in FIG. 11C, the item information after correction is displayed on the screen of the multi-item keyboard. As shown in FIG. 12B, the item information on commodity A after correction is also displayed on the customer display panel 16. Thereafter, the operator scans the next C commodity with the bar-code reader 11 (step B90).

Figure 13:
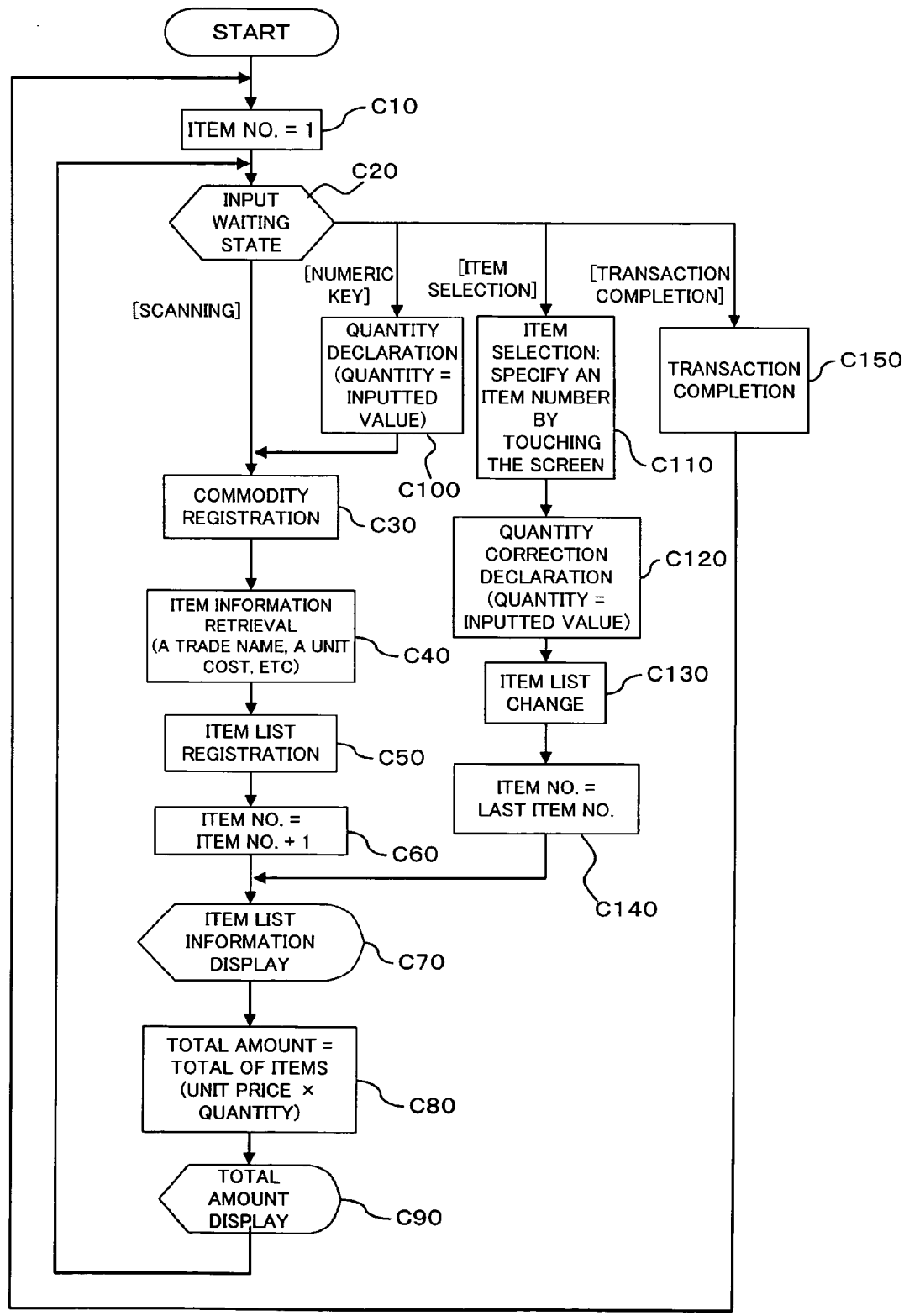
FIG. 13 is a flowchart used to explain operation of the POS terminal shown in FIG. 1.

Next, operation of the POS terminal 10 will be described according to a flowchart (steps C10 to C150) shown in FIG. 13.

When performing a new transaction in the POS terminal 10, the registration part 22 performs initialization by setting 1 to the item number (step C10) and shifts to an input waiting state (step C20). When a numeric value is input with a numeric key of the keyboard 11 (see the route labeled "Numeric Key" in step C20), the registration part 22 judges that a quantity has been declared, and acquires the input value represented by the numeric key as the quantity (step C100).

Thereafter, if a commodity is scanned with the bar-code reader 11 (step C30), the registration part 22 performs the retrieval of commodity information (item information) such as an item name and a unit price, by referring to the item master 32 of the POS server 30 in dependence on the commodity code read with the bar-code reader 11 (step C40).

The registration part 22 registers the acquired item information in the item information list memory part 13 so that it is correlated with the item number (step C50). The value of the item number is incremented by 1 (step C60), and the item list information is displayed on the touch panel 17 (step C70).

The calculation part 15 calculates the total prices and total amount for commodities involved in a transaction (step C80). The price information is displayed on the touch panel 17, the customer display panel 16, and the display of the multi-item keyboard (step C90), and the operation of the POS terminal 10 returns to step C20. Note that the total amount calculated by the calculation part 15 in step C80 is the sum of the total prices calculated by multiplying a unit price by a quantity for each item.

On the other hand, when a commodity is scanned with the bar-code reader 11 (see the route labeled "Scanning" in step C20), the registration part 22 sets a quantity "1". Next, step C30 is carried out.

When specific item information is selected by inputting an item number through the touch panel 17 or keyboard 12 (see the route labeled "Item Selection" in step C20), the selected item information is acquired (step C110). Thereafter, if the correction of a quantity is declared through the Quantity Correction key 121 or 171, a numeric value (input value) input through a numeric key of the keyboard 12 is acquired as a corrected quantity by the quantity correction part 14 (step C120). For the item information selected in step C110, a correction is made by replacing the quantity with the corrected quantity. In this way, a change in item list information is made (step C130).

Figure 4:
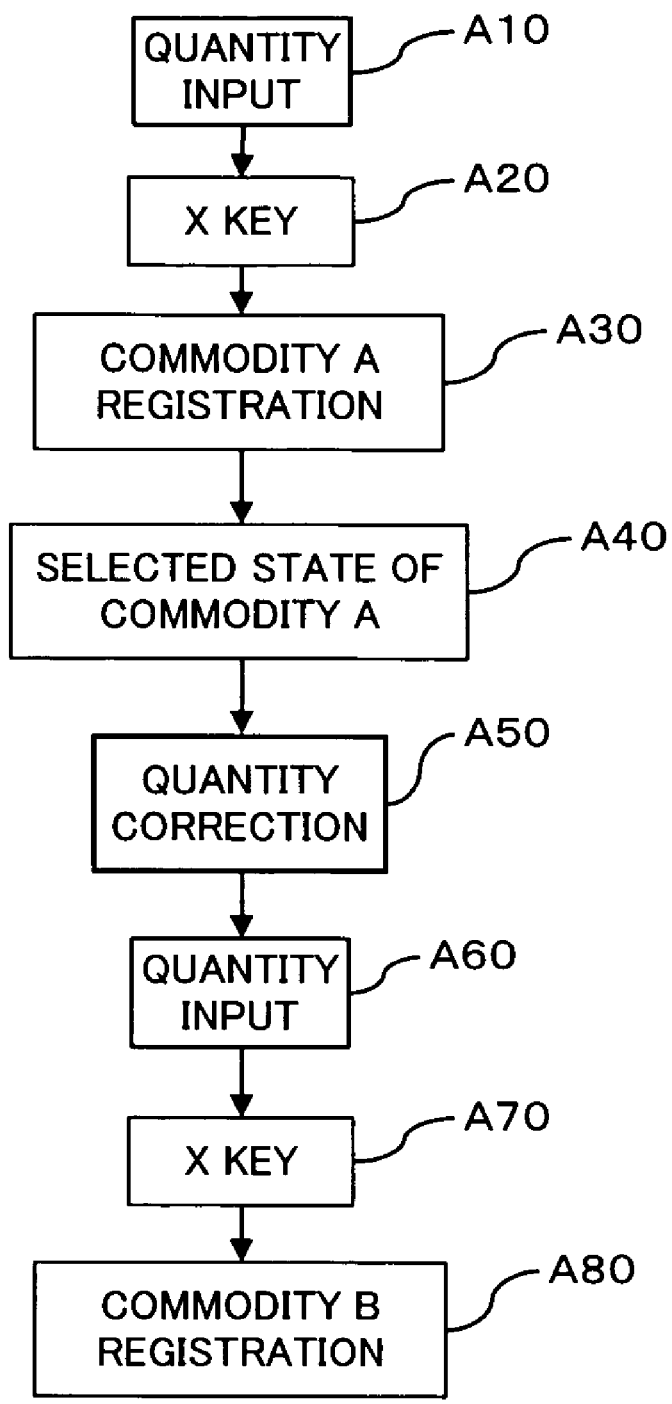
FIG. 4 is a flowchart showing how a quantity for an item last input is to be corrected by the POS terminal shown in FIG. 1.

Note that the above-described steps C110 to C130 correspond to the aforementioned steps A40 to A70 in FIG. 4 or steps B50 to B90 in FIG. 7.

Thereafter, the last item number is set to the item number (step C140), and step C70 is carried out.

When a key indicative of the completion of a transaction is input (see the route labeled "Transaction Completion" in step C20), the POS terminal 10 performs various processes involved in the transaction completion such as the printing of a receipt by the receipt printer 20, printing of journal paper by the journal printer 21, and customer checkout (step C150). The operation of the POS terminal 10 returns to step C10.

Thus, according to the POS terminal 10 of the preferred embodiment of the present invention, when a quantity is corrected for item list information registered last, the quantity can be corrected by inputting only a corrected quantity through the keyboard 12, etc., without rescanning the commodity with the bar-code reader 11. This renders it possible for operator to handle the POS terminal 10 easily and can enhance the operation efficiency of the POS terminal 10.

In addition, in a transaction performed by the POS terminal 10, even when a quantity is corrected for an item registered two or more before, it is corrected by selecting an item to be corrected with the touch panel 17 or keyboard 12 and depressing the Quantity Correction key 121 or 171. That is, a quantity can be corrected by inputting only a corrected quantity through the keyboard 12, etc., without rescanning the commodity with the bar-code reader 11. Therefore, the operator is able to handle the POS terminal 10 easily and the operation efficiency of the POS terminal 10 can be enhanced.

Furthermore, since it is not necessary to rescan a commodity with the bar-code reader 11 when correcting a quantity for the commodity, commodity misregistration is difficult to occur. Thus, reliability can also be enhanced.

Although the preferred embodiment has been described with reference to the case where a quantity and commodities are registered by the pre-declaration method, the quantity correction method of the present invention may be applied when a quantity and commodities are registered by the after-declaration method. That is, in a transaction performed by the POS terminal 10, when correcting a quantity for an item input two or more before, item information to be corrected is first selected with the touch panel 17. Then, a signal indicative of quantity correction is input through the Quantity Correction key 121 or 171. Next, a corrected quantity is input through the keyboard 12. In this way, a quantity can be corrected by inputting only a corrected quantity through the keyboard 12 without rescanning a commodity with the bar-code reader 11. Thus, as with the preferred embodiment, the operator is able to handle the POS terminal 10 easily and the operation efficiency of the POS terminal 10 can be enhanced.

While the present invention has been described with reference to the preferred embodiment thereof, the invention is not to be limited to the details given herein, but may be modified within the scope of the invention hereinafter claimed.

For example, in the preferred embodiment, for various kinds of input operations through the keyboard 12 or touch panel 17, the input operation last performed may be cancelled by depressing the CLEAR key 123 immediately after the input operation.

Note that if the preferred embodiment of the present invention is disclosed, it is possible for those skilled in this art to carry out and manufacture the POS terminal, the quantity correction method, the computer-readable medium with a quantity correction program, made in accordance with the present invention.

And the POS terminal, the quantity correction method, and the computer-readable medium can be summarized as follows.

What is claimed is:

1. A point-of-sale terminal of pre-declaration type, which performs commodity registration after a declaration of a quantity when selling a plurality of identical commodities, including: a scanner for inputting commodity information for commodities involved in a transaction as a commodity information input part; a quantity input part for inputting a quantity for the commodities; a storage part for storing the quantity and the commodity information, as item information; a calculation part for calculating an amount of money involved in the transaction depending on the item information stored in said storage part, said point-of-sale terminal comprising:
a quantity correction indication part for indicating correction of the quantity; and
a quantity correction part for correcting the quantity, when the correction is indicated by said correction indication part, by replacing the quantity in the item information last stored in the storage part with another quantity newly input by the quantity input part;
said calculation part recalculating the amount of money based on the new quantity.

2. A point-of-sale terminal including: a scanner for inputting commodity information for commodities involved in a transaction; a quantity input part for inputting a quantity for the commodities; a storage part for storing the quantity and the commodity information, as item information; a calculation part for calculating an amount of money involved in the transaction depending on the item information stored in said storage part, said point-of-sale terminal comprising:

a quantity correction indication part for indicating correction of the quantity;

an item selection part for selecting item information containing the quantity to be corrected, from the item information stored in said storage part; and a quantity correction part for correcting the quantity, when the correction is indicated by said correction indication part, by replacing the quantity in the item information selected by said item selection part with another quantity newly input by said quantity input part;

said calculation part recalculating the amount of money based on the new quantity.

3. A quantity correction method for use in a point-of-sale terminal of pre-declaration type, which performs commodity registration after a declaration of quantity when selling a plurality of identical commodities, which includes: a scanner for inputting commodity information for commodities involved in a transaction; a quantity input part for inputting a quantity for the commodities; a storage part for storing the quantity and the commodity information, as item information; a calculation part for calculating an amount of money involved in the transaction depending on the item information stored in the storage part;

said method comprising:

indicating correction of the quantity; and correcting the indicated quantity by replacing the quantity in the item information last stored in the storage part with another quantity newly input by the quantity input part; and recalculating the amount of money calculated in the calculation part based on the newly input quantity.

4. A quantity correction method for use in a point-of-sale terminal which includes: a scanner for inputting commodity information for commodities involved in a transaction; a quantity input part for inputting a quantity for the commodities; a storage part for storing the quantity and the commodity information, as item information; a calculation part for calculating an amount of money involved in the transaction depending on the item information stored in the storage part;

said method comprising:

indicating correction of the quantity;

selecting item information containing the indicated quantity to be corrected, from the item information stored in said storage part;

correcting the quantity by replacing the quantity in the selected item information with another quantity newly input by the quantity input part; and recalculating the amount of money calculated in the calculation part based on the newly input quantity.

5. A computer-readable storage medium recording therein a quantity correction program for causing a computer to function for use in a point-of-sale terminal of pre-declaration type, which performs commodity registration after a declaration of a quantity when selling a plurality of identical commodities, which includes: a scanner for inputting commodity information for commodities involved in a transaction; a quantity input part for inputting a quantity for the commodities; a storage part for storing the quantity and the commodity information, as item information; and a calculation part for calculating an amount of money involved in the transaction depending on the item information stored in the storage part, said program instructing the computer to perform a method comprising:

indicating correction of the quantity; and correcting the indicated quantity by replacing the quantity in the item information last stored in the storage part with another quantity newly input by the quantity input part;

said calculation part recalculating the amount of money based on the newly input quantity.

6. A computer-readable storage medium recording therein a quantity correction program for causing a computer to function for use in a point-of-sale terminal which includes: a scanner for inputting commodity information on commodities involved in a transaction; a quantity input part for inputting a quantity for said commodities; a storage part for storing the quantity and the commodity information, as item information; a calculation part for calculating an amount of money involved in the transaction depending on the item information stored in the storage part, said program instructing the computer to perform a method comprising:

indicating correction of the quantity;

selecting item information containing the indicated quantity to be corrected, from the item information stored in the storage part; and correcting said quantity by replacing the quantity in the selected item information with another quantity newly input by the quantity input part;

said calculation part recalculating the amount of money based on the newly input quantity.

* * * * *